(12) United States Patent
Brebant

(10) Patent No.: US 11,285,829 B2
(45) Date of Patent: Mar. 29, 2022

(54) DEVICE FOR CONTROLLING AND ASSISTING THE CHARGE LEVELLING OF A BATTERY MODULE, AND CORRESPONDING METHOD AND KIT

(71) Applicant: E-XTEQ Europe, Saint-Germain-de-la-Grange (FR)

(72) Inventor: Morgan Brebant, Gambias (FR)

(73) Assignee: E-XTEQ Europe, Saint-Germain-de-la-Grange (FR)

(*) Notice: Subject to any disclaimer, the term of this patent is extended or adjusted under 35 U.S.C. 154(b) by 10 days.

(21) Appl. No.: 17/056,178

(22) PCT Filed: May 10, 2019

(86) PCT No.: PCT/EP2019/062001
§ 371 (c)(1),
(2) Date: Nov. 17, 2020

(87) PCT Pub. No.: WO2019/219515
PCT Pub. Date: Nov. 21, 2019

(65) Prior Publication Data
US 2021/0213840 A1 Jul. 15, 2021

(30) Foreign Application Priority Data

May 18, 2018 (FR) ...................................... 1854201

(51) Int. Cl.
*B60L 53/16* (2019.01)
*B60L 53/18* (2019.01)
*H01M 10/42* (2006.01)

(52) U.S. Cl.
CPC ............... *B60L 53/16* (2019.02); *B60L 53/18* (2019.02); *H01M 10/425* (2013.01); *H01M 2010/4271* (2013.01); *H01M 2220/20* (2013.01)

(58) Field of Classification Search
CPC ...... B60L 53/16; B60L 53/18; H01M 10/425; H01M 2010/4271; H01M 2220/20
(Continued)

(56) References Cited

U.S. PATENT DOCUMENTS 7,029,338 B1    4/2006 Orange et al.
9,851,411 B2 *  12/2017 Champlin .......... G01R 31/3842
(Continued)

FOREIGN PATENT DOCUMENTS

| CN | 205304311 U | 6/2016 |
| EP | 2979918 A1 | 2/2016 |
| WO | 0169726 A1 | 9/2001 |

*Primary Examiner* — Nathaniel R Pelton
(74) *Attorney, Agent, or Firm* — Young Basile Hanlon & MacFarlane, P.C.

(57) ABSTRACT

The invention relates to a device (64) for controlling and assisting the charge levelling of a battery module (2), for cooperating with a charge cable (3) and a charge monitoring cable (4) selected such that they are compatible with said battery module. Said device (64) includes means for recognising and identifying said charge cable (3) and said charge monitoring cable (4) in a connection configuration, and means for supplying recognition and identification data; means for storing and querying a library of correspondence and compatibility between said battery modules and said cables (3, 4) compatible with each of said battery modules; comparison means for comparing recognition and identification data supplied by said recognition and identification means with the data stored in said library of correspondence and compatibility, and means for supplying a comparison result; and display and/or notification means activated by said comparison means.

19 Claims, 5 Drawing Sheets

(58) Field of Classification Search
USPC .......................................................... 320/104
See application file for complete search history.

(56) References Cited

U.S. PATENT DOCUMENTS

| | | |
|---|---|---|
| 10,381,752 B2 | 8/2019 | Kaehny et al. |
| 2014/0217978 A1 | 8/2014 | Gellert |
| 2015/0140872 A1 | 5/2015 | Orange et al. |
| 2016/0009182 A1* | 1/2016 | Nakanishi ............... B60L 53/14 |
| | | 701/22 |
| 2016/0121735 A1 | 5/2016 | Sugano |

* cited by examiner

DEVICE FOR CONTROLLING AND ASSISTING THE CHARGE LEVELLING OF A BATTERY MODULE, AND CORRESPONDING METHOD AND KIT

CROSS-REFERENCE TO RELATED APPLICATIONS

This application claims priority benefit to Patent Cooperation Treaty Application No. PCT/EP2019/062001 filed May 10, 2019, which claims priority benefit to French Patent Application No. 1854201 filed May 18, 2018 the entire contents of both applications incorporated herein by reference.

TECHNICAL FIELD

The invention relates to the field of electric batteries for motor vehicles.

More specifically, the invention in particular relates to the field of the electrical connection for maintaining electric batteries.

The invention specifically concerns the connectors used for the levelisation of the electrical charge of a battery module within a battery pack, typically reversible, reusable connection means, in particular capable of being used for electronically monitoring the charging and/or discharging of a battery, in particular for equalising the electrical charge of a battery module within a battery pack, for example when this module replaces a defective battery module.

The invention can be scaled to other situations where there is a need to produce electrical connections to monitor the state of charge of the battery modules, and the internal cells thereof, during battery maintenance operations.

BACKGROUND

Electric and hybrid vehicles are attracting high interest and are currently being increasingly developed by car manufacturers.

These vehicles implement a battery pack generally formed by a plurality of battery modules side-by-side and connected to one another in a protective unit.

Each module comprises a certain number of electrical power storage cells, or "electrical cells", joined and connected to one another, which can take a cylindrical, prismatic or pouch-cell form.

Moreover, inside the module, the electrical cells, which are generally mounted in series, are individually accessible via monitoring circuits—typically simple cablings—in particular comprising the possibility of measuring the individual charging voltage thereof, as well as, in some cases, other parameters for each cell and for each module, such as the temperature thereof.

During the life of a battery pack, a module may become defective: in such a case, it must be extracted from the battery pack and replaced by a new module to ensure proper operation of the battery.

However, during the installation thereof, the new module can have a state of charge, or electrical voltage, that differs from that of the other modules of the battery pack, which is not ideal since this causes a non-homogeneous discharge rate and level of wear within the battery pack.

The electrical voltage of this new module must therefore be levelised or equalised relative to the electrical voltage of the other modules of the battery pack, so as to have an equivalent state of charge.

In practice, the module must undergo a differential charging or discharging operation in order to restore a uniform state of charge among the different modules.

The equalisation or levelisation or balancing of the charge of a module among a series of modules of a battery pack can also take place for a non-defective module having a different state of charge to the other modules, without necessarily having to replace this module.

The electrical cells forming the module must thus be monitored to determine whether the desired state of charge has been reached.

In order to properly conduct charge levelisation—or balancing—and charge monitoring operations, a module charge levelisation and monitoring station, known as a module balancer, must be used, to which the module can be connected.

In order to levelise a charge, a Y-shaped three-branch charge levelisation cable, or "two-in-one" cable, is typically used between the module and the charge levelisation and monitoring station.

Moreover, in order to check and monitor the state of charge of the electrical cells, a monitoring cable is conventionally used between the module and the charge levelisation and monitoring station.

Thus, as shown in FIG. 1, a module charge levelisation and monitoring installation comprises at least one battery module 2, originating from a battery pack 100, connected to a charge levelisation and monitoring station 1 by way of two cables, a first cable, referred to as a charge levelisation cable 3 and a second cable, referred to as a monitoring cable 4.

A charge levelisation and monitoring station conventionally includes a connection interface, shown in FIG. 3, having, on the one hand at least one first charging connector 10 intended to cooperate with an end of a first branch of the charge levelisation cable 3, more specifically the stem of the Y, and on the other hand at least one second connector 11 intended to cooperate with one end of the monitoring cable 4.

The battery module includes, on the one hand, two charging terminals 20, 21, one positive and one negative, shown in FIG. 2, intended to cooperate with the ends of the two other branches of the charge levelisation cable 3, and on the other hand a monitoring connector 22 intended to cooperate with the end of the monitoring cable 4.

The module 2 shown in FIG. 2 constitutes only one example of a battery module. Numerous module types exist, designed by various car manufacturers, which can be very different to one another, but which always have both at least two charging terminals and at least one monitoring connector.

Each module model can however have specific charging terminals and monitoring connectors that differ from those of the other models.

Thus, depending on the module, there are a plurality of possible combinations for the first charge levelisation cable and for the second state-of-charge monitoring cable.

This current lack of standardisation of the monitoring connectors, and more generally of the technical specifications of the interfaces and cablings of the charging terminals and of the battery monitoring units and the terminations thereof, generates difficulties and complexities as regards the maintenance of these batteries.

Thus, in vehicle service garages and/or in battery maintenance facilities, the maintenance operators must have as many charging cables on the one hand, and as many monitoring cables 4 as there are types of terminals and monitoring connectors respectively, so as to be able to monitor the charge level of any battery module model. The need to procure and store this diversity of cables poses a problem, which is all the more pregnant since there are currently more than twenty types of battery modules, and more than ten different connection interfaces, and since this diversity is growing as a result of the continuous development of techniques and the arrival of new stakeholders on these fast-growing markets.

As a result, in the current situation, operators must manage a large quantity of different cable assemblies, which is inefficient and a source of confusion and unproductive time: each workstation must constantly check that it has the whole diversity of cablings allowing the operator to work with any battery type and that none have been misplaced, and for each new intervention, the operator must again identify the appropriate monitoring cable, and where relevant the appropriate charging cable, from among a plurality of cables.

SUMMARY

The purpose of the invention is to propose a technical solution for identifying the cables capable of cooperating with a plurality of battery module models, which simplifies and rationalises this situation, and in particular allows the operator to quickly view which combination of cables is required to connect the module to the charge levelisation and monitoring station, and to assist the operator with this operation.

For this purpose, the invention proposes a device for monitoring and assisting with the charge levelisation of a battery module, intended to cooperate with a kit of cabling devices designed to be connected to both an electronic monitoring circuit of an electric battery module and to a station for monitoring said battery module, the kit of cabling devices being formed by a first set of at least two charging cables and/or a second set of at least two charge monitoring cables.

Each cabling device in the configuration in which it is connected to a determined battery module comprises a connecting pair of complementary compatible cables, i.e. on the one hand a charging cable, and on the other hand a charge monitoring cable, each selected from said kit of cabling devices such that they are compatible with said battery module.

According to the invention, the device comprises:

means for recognising and identifying said charging cable and said charge monitoring cable of said cabling device in the connected configuration, and means for supplying recognition and identification data;

means for storing and querying a correspondence and compatibility data library between said battery modules and said cables of said kit of cabling devices compatible with each of said battery modules;

comparison means for comparing the recognition and identification data supplied by said recognition and identification means with the data stored in said correspondence and compatibility data library, and means for supplying a comparison result;

display and/or notification means activated by said comparison means.

According to another aspect of the invention, said at least one charging cable is of the multi-connector type, comprising:

a main cabling branch situated at a first end of said cabling device, said main branch being provided with a connection plug intended to be connected to a complementary terminal of said monitoring station;

a plurality of secondary cabling branches, each of said secondary branches being provided with an electrical connector intended to be connected to a complementary connector of said battery module.

According to another aspect of the invention, said cables comprise identifying elements, integrated into all or part of each cable and/or of one of more cable connectors and said recognition and identification means are formed by at least one device for detecting and reading said identifying elements.

According to another aspect of the invention, said identifying elements belong to the group comprising electronic and/or electromagnetic, active or passive, contact or contactless chips, tags or beacons, including electric and electronic measuring circuits and RFID chips.

According to another aspect of the invention, said display and/or notification means comprise a display screen.

According to another aspect of the invention, said display and/or notification means comprise a data entry screen.

According to another aspect of the invention, said device is an autonomous unit.

According to another aspect of the invention, said device is integrated into said monitoring station.

According to another aspect of the invention, said device comprises means for updating said library.

The invention further proposes a method for monitoring and assisting with the charge levelisation of a battery module, intended to cooperate with at least one charging cable and at least one charge monitoring cable, selected from within a kit of cabling devices designed to be connected to both an electronic monitoring circuit of an electric battery module and a station for monitoring said battery module, The kit of cabling devices is formed by a first set of at least two charging cables and/or by a second set of at least two charge monitoring cables, each cabling device in the configuration in which it is connected to a determined battery module comprises a connecting pair of complementary compatible cables, i.e. on the one hand a charging cable, and on the other hand a charge monitoring cable, each selected from said kit of cabling devices such that they are compatible with said battery module.

The method implements a device according to the invention, intended to cooperate with said kit, and comprises the steps of:

coupling said charging cable to said monitoring station;

coupling said monitoring cable to said monitoring station and/or placing said monitoring cable in the vicinity of said monitoring station;

identifying said monitoring cable thanks to said recognition and identification means of the device;

determining and displaying a list of references of battery modules compatible with said charging cable and said charge monitoring cable.

According to another aspect of the invention, said method further comprises, after coupling said charging cable, a step of identifying said charging cable thanks to said recognition and identification means of the device.

According to another aspect of the invention, said method further comprises a step of displaying the charge monitoring cables and/or the modules compatible with said charging cable.

According to another aspect of the invention, said method further comprises a step of activating said display and/or notification means of said device by said comparison means when said comparison result between said recognition and identification data and the data stored in said correspondence and compatibility data library is zero.

BRIEF DESCRIPTION OF THE DRAWINGS

Other features and advantages will be better understood upon reading the following detailed description of specific non-limiting embodiments of the invention, provided for illustration purposes, and the accompanying drawings, in which.

DETAILED DESCRIPTION

The invention thus proposes a new concept for managing the cabling devices applicable to the connection of a battery module to a charge levelisation and monitoring station, which provides assistance and optimisation for the operator in the case of kits overflowing with cabling, in order to orient and facilitate the search for the right sets of cables and notify the operator of selection errors where appropriate.

For this purpose, the invention relates on the one hand to the technical features specific to the assistance and cabling kits and devices according to the invention, and on the other hand to the original automated verification and detection procedures and HMI communication procedures.

The invention in particular proposes a device for monitoring and assisting with the charge levelisation of a battery module intended to cooperate with a kit of cabling devices, formed by a first set of at least two charging cables and/or a second set of at least two charge monitoring cables, these cables being designed to be connected to both an electric battery module and to a station for monitoring the battery module.

According to the general principle of the invention, the device comprises:

means for recognising and identifying the charging cable and the charge monitoring cable, and means for supplying recognition and identification data;

means for storing and querying a correspondence and compatibility data library between the battery modules and the cables of the kit compatible with each of the battery modules;

comparison means for comparing the recognition and identification data supplied by the recognition and identification means with the data stored in the correspondence and compatibility data library, and means for supplying a comparison result;

display and/or notification means activated by the comparison means.

Figure 1:
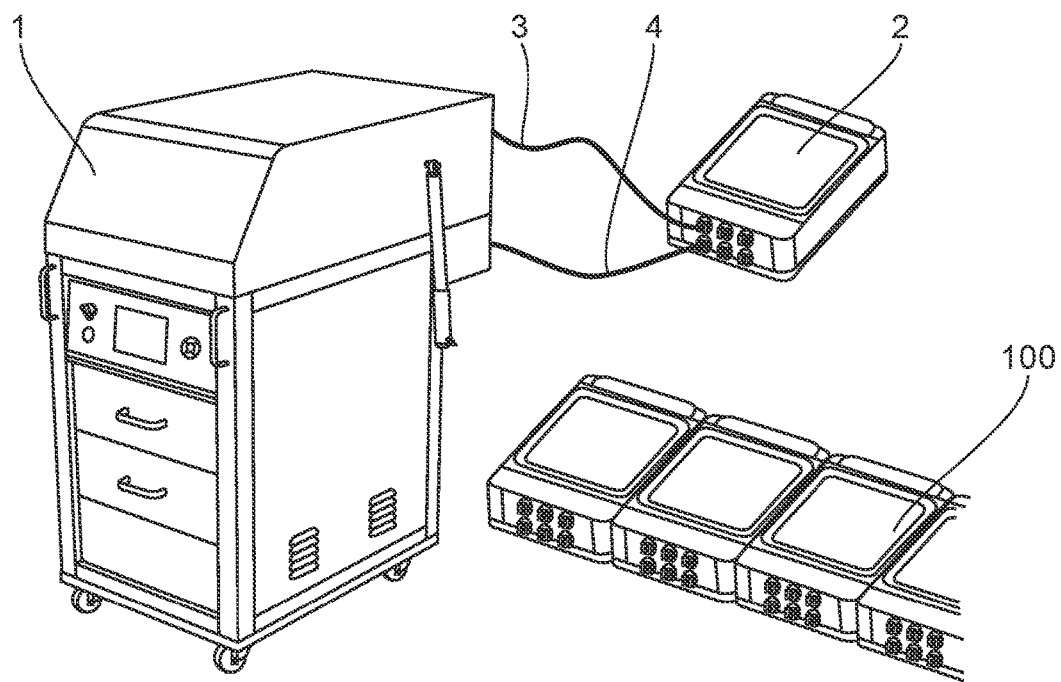
FIG. 1 shows a battery module charge levelisation and monitoring station connected to a battery module by way of a first charging cable, and a second charge monitoring cable.
Figure 2:
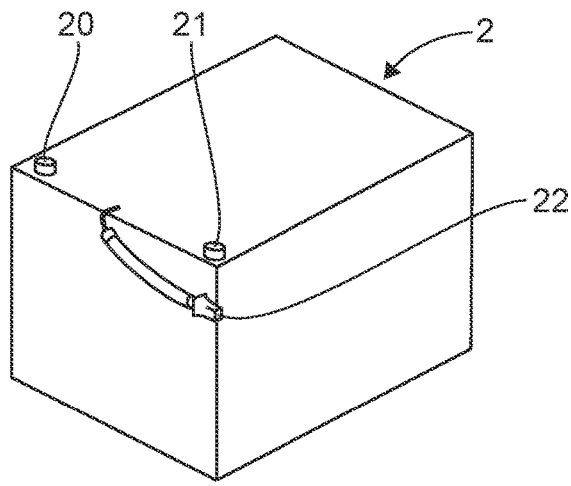
FIG. 2 shows one example of a battery module comprising, on the one hand, two electrical charging terminals and on the other hand an electrical connector dedicated to monitoring tasks.
Figure 3:
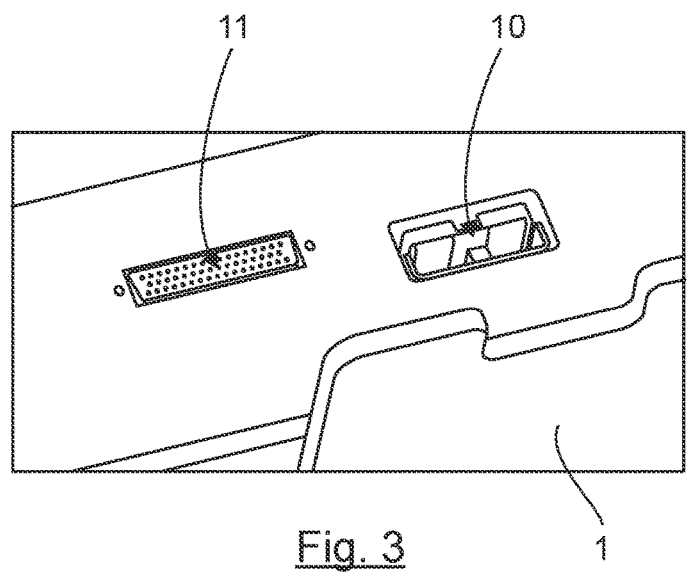
FIG. 3 shows the interface of a charge levelisation and monitoring station comprising at least one charging connector dedicated to charge levelisation and at least one connection terminal dedicated to charge monitoring.
Figure 4:
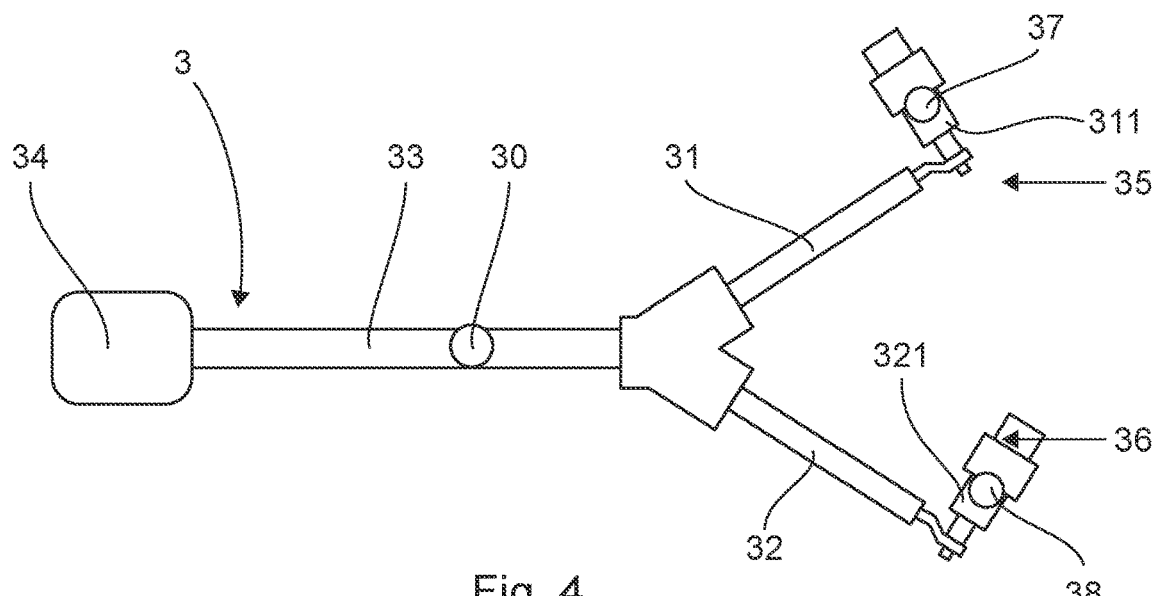
FIG. 4 shows a Y-shaped charging cable comprising a main branch intended to be connected to the charging connector of the station and two secondary cable branches intended to be connected to the electrical charging terminals of the module.
Figure 5:
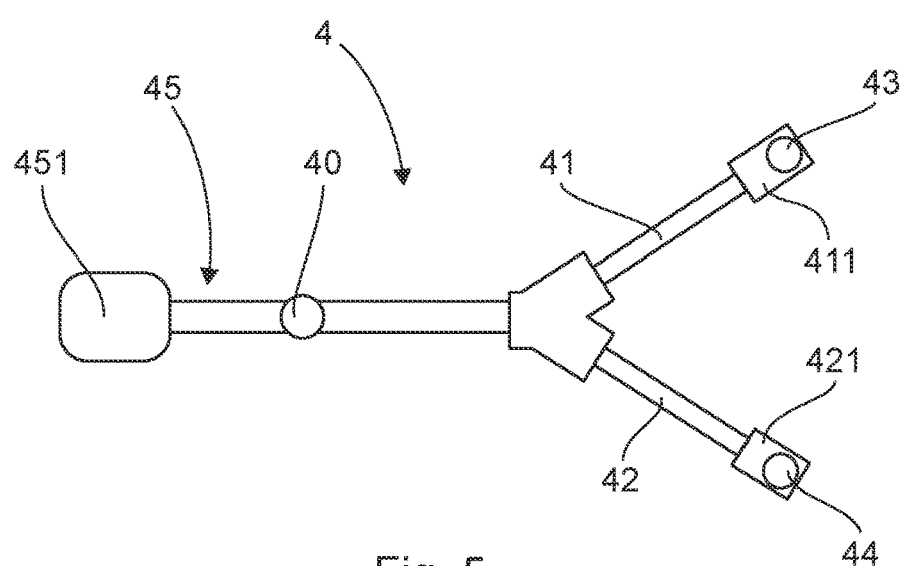
FIG. 5 shows a charge monitoring cable comprising a main branch intended to be connected to the connection terminals of the station and two secondary cable branches intended to be connected to complementary connectors of the module.

FIGS. 4 and 5 respectively show possible, but non-limiting embodiments for a charging cable 3 and a charge monitoring cable 4 for monitoring the charge of a battery module, of the type capable of being used within the scope of the invention.

In this case, the charging cable 3 is a "two-in-one" type cable, and comprises three cable branches: a main branch 33 intended to be connected to the charge monitoring station 1 and two secondary branches 31, 32 intended to be connected to the module 2, typically to the "+" (positive) pole and to the "−" (negative) pole of the module, or vice-versa.

For this purpose, the main branch 33 includes, at the end thereof, a connector 34 intended to be inserted into a charging connector 10 of the monitoring station and the secondary branches 31, 32 each include, at the end thereof, connection plugs 311, 321 intended to be inserted into charging terminals of the module 2.

This charging cable 3 thus comprises three separate connecting elements 34, 311, 321.

The charge monitoring cable 4 comprises a main branch 45 intended to be connected to the charge monitoring station 1 and two secondary branches 41, 42, each of which is intended to be connected to a module 2.

For this purpose, the main branch 45 includes, at the end thereof, a connection plug 451 intended to be inserted into an electrical connection terminal 11 of the monitoring station and the secondary branches 41, 42 each include, at the end thereof, electrical connectors 411, 421 each of which is intended to be connected to a complementary connector 22 of the module 2.

The monitoring cable 4 is of the "multi-connector" type in that it has a plurality of secondary branches and corresponding connectors, for example between two and ten secondary branches, and preferably between three and five secondary branches.

The secondary branches are interconnected with the main branch via a power distribution module which procures a selective electrical connection between the connection plug and each of the electrical connectors 411, 421.

Each electrical connector 411, 421 has a different connection configuration to that of the other electrical connectors, adapted to a specific type of battery module, complying with a different connection standard, for example as regards the number, dimensions, geometrical configuration and/or arrangement of the individual conductors of each connector 411, 421.

Thus, a single charge monitoring cable 4 is compatible with a plurality of battery modules having different connection standards (for example of a different size, power or even manufacturer).

The principle of such a "multi-connector" monitoring cable 4, and different embodiments and alternative embodiments are described in a parallel priority patent application by the same applicant and filed on the same day as the present patent application, French Patent Application No. 1854203 published as PCT Patent Application No. WO2019/219893A1 the contents of this parallel priority patent application being incorporated herein by reference.

This charging cable 4 thus comprises at least three separate connecting elements 451, 411, 421.

However, depending on the type of battery module to be charged on the station, for example depending on the manufacturer, the size or the power thereof, the charging terminals 20, 21 and the monitoring connector 22 for the module may vary.

Thus, the charging cable 3 and monitoring cable 4 to be used for a given module must be selected by the operator from among the sets of available cables, so that the different connecting elements 311, 321, 411 connecting to the module 2 are compatible therewith.

Moreover, the interface of the monitoring station 1 can be developed (for example as a result of technical developments) and thus can have various connection terminals 11 and charging connectors 10.

Thus, the charging cable 3 and monitoring cable 4 must also be selected by the operator from among the sets of available cables, so that the different connecting elements 34, 451 connecting to the station 1 are compatible with the interface thereof.

In other words, a kit of cabling devices according to the invention must comprise charging cables 3 and charge monitoring cables 4 that offer all necessary combinations so as to be adapted to all types of modules and stations, the connection interfaces whereof may vary.

There is thus a plurality of possible combinations of these charging cables 3 and charge monitoring cables 4 which the operator must select from among the sets of available cables as a function of the type of module to be charged and the type of station used.

According to the invention, in order to allow the operator to easily define which combination of charging cable and of charge monitoring cable 3, 4 is appropriate, a device 64 for monitoring and assisting with charge levelisation is used, allowing it to be determined which types of cables 3, 4 are close to—or connected to—the station, in particular by detecting the connecting elements 34, 451, 311, 321, 411, 421 thereof, and thus providing the operator with a result in the form of a list of modules compatible with these cables 3, 4.

According to the invention, in order to allow the cables 3, 4 to be identified, they are provided with identifying elements in the form of tags which are preferably integrated into all or part of the connecting elements 311, 321, 411, 421 connecting to the module.

Each plug or connector can thus be individually identified.

In some circumstances, the tags can also be integrated into the sheath forming the main branch 33, 45 of the cables.

Even in the case of multi-connector cables, a single tag identifying the cable as a whole can suffice if the aim is merely to know whether the cable includes the right connector and if the nature of the different connectors of the cable is also well known (for example in the data library that will be mentioned hereafter).

FIG. 4 thus shows an example of a charging cable 3 comprising a tag 30 integrated into the main branch thereof, and two tags 37, 38 integrated into each connection plug 311, 321 respectively.

In practice, the cable will instead comprise either the two tags 37 and 38 (one on each of the connection plugs 311, 321), or a single tag 30 for the cable as a whole, the three-tag 30, 37 and 38 configuration being a priori redundant.

It should be noted that the presence of tags on the connection plugs 311, 321 of the charging cable is not always necessary, insofar as these connection plugs are more standardised than the connectors of the multi-connector monitoring cable 4 discussed hereafter.

FIG. 5 shows an example of a monitoring cable 4 comprising a tag 40 integrated into the main branch thereof, and two tags 43, 44 integrated into each electrical connector 411, 421 respectively.

In this case, each secondary branch and/or secondary branch connector of the charge monitoring cable 4 is provided with a specific tag identifying the type of connector concerned, and thus indirectly the one or more modules compatible with the secondary branch.

Tags (not shown) can also be integrated into the connecting elements 34, 451 connecting to the station 1.

In practice, the cable will instead comprise either the two tags 43 and 44 (one on each of the connectors 411, 421), or a single tag 40 for the cable as a whole, the three-tag 40, 343 and 44 configuration being a priori redundant.

In practice, these tags can be chosen from among electronic and/or electromagnetic, active or passive, contact or contactless identification chips, tags or beacons.

In particular, these tags can be, for example, in a non-limiting manner, electric circuits, passive RFID chips or transmitters activated by electromagnetic illumination or by an effective coupling of the cable, of the plug or of the connector, or by any other means.

According to one specific embodiment, at least certain tags can be formed by a voltage-measuring circuit or by a circuit measuring any other parameter representative of the fact that the connector and/or the cable is coupled.

Where appropriate, activation of the tag depends on the simple existence of a voltage (or of a current), or optionally on the value of this voltage (or of this current).

Thus, such tags, in the form of voltage-measuring circuits, only provide cable identification information when the cable is connected to the module and/or to the station: they operate by electrical contact.

When the connection is not made, no voltage is measured, and thus the cable is not detected.

Numerous other embodiments of the tags can be considered while still remaining within the scope of the invention.

In other words, according to the query conditions of each tag and/or the carriage of the identification signal, recognition can be provided either at the time of coupling, or as soon as the cable, plug and/or connector is placed nearby, in an identification zone in the vicinity of and within range of the recognition means. When the recognition means are mounted on a mobile device, it is this device that can be placed near a cable, a plug or a connector to carry out the recognition.

Figure 7:
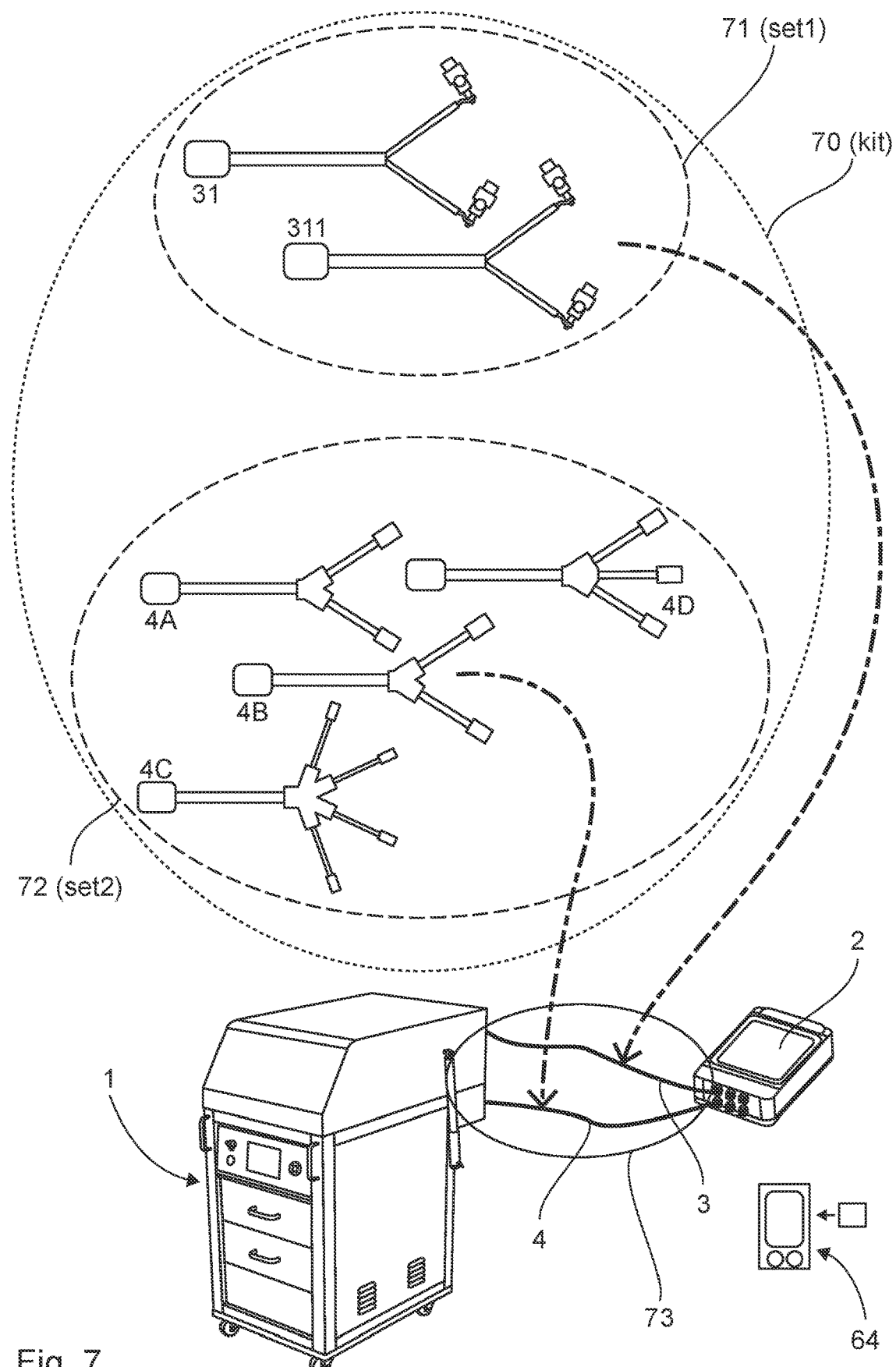
FIG. 7 shows a kit of cabling devices formed by a first set of at least two charging cables and/or by a second set of at least two charge monitoring cables.

FIG. 7 shows an example of a kit 70 of cabling devices comprising a first set 71 of two charging cables 31, 311 and a second set 72 of four charge monitoring cables 4A, 4B, 4C, 4D, each cable being provided with the aforementioned tags.

The charging cables 31, 311 are both of the "two-in-one" type, however can have different connection plugs for connecting to the module and to the station.

The charge monitoring cables 4A, 4B, 4C, 4D have a varying number of secondary branches: cables 4A and 4B are of the "two-in-one" type, cable 4C is of the "four-in-one" type and cable 4D is of the "three-in-one" type.

It goes without saying that the kit 70 shown is only an illustrative, non-limiting example, and that this kit can be more generally formed by a first set 71 of at least two charging cables and/or by a second set 72 of at least two charge monitoring cables.

A connecting pair 73 of charging and charge monitoring cables 3, 4 is used to connect a battery module 2 to a monitoring station 1.

This connecting pair 73 of cables comprises, on the one hand, a charging cable 3 selected from among the charging cables 31, 311 forming the first set 71, and on the other hand a charge monitoring cable 4 selected from among the charge monitoring cables 4A, 4B, 4C, 4D forming the second set 72.

The cables 3 and 4 forming this connecting pair 73 of cables are thus identified and each selected from within the kit 70 of cabling devices so as to be compatible with the battery module.

In this instance, FIG. 7 shows the case where the cables 311 and 4B should be selected to connect the monitoring station 1 to the module 2.

According to the invention, a device 64 for monitoring and assisting with the charge levelisation of the battery module 2 is used to assist the operator with this selection.

This device 64 integrates a program and a data library of correspondences and compatibilities between cable references and module references, which allows, when the operator connects at least one of the charging 3 and charge monitoring 4 cables selected from among the kits 71, 72, it to be defined, in the form of a list, which module references are compatible with these specific cables.

More specifically, the data library contains, for this purpose, a plurality of references of battery modules 2, for example at least about forty if all references of the modules commercially available today are to be taken into account, and a plurality of references of charging cables 3 and of charge monitoring cables 4.

This database can be provided in the form of a fixed and/or removable memory (67) and/or can be downloaded and updated automatically, via the internet, or by the operator, by manual input or by a contactless communication means, or by any other appropriate means.

The data library further contains a correspondence and/or compatibility table, or any equivalent means, which allows the device 64 to deduce, from given references of cables 3, 4, at least one reference of a battery module 2, and/or vice-versa.

According to a first embodiment of this aspect of the invention, the input parameters of the compatibility table are thus, for example, the references of the cables 3, 4 and the output parameters are the reference of the one or more compatible battery modules.

Figure 6:
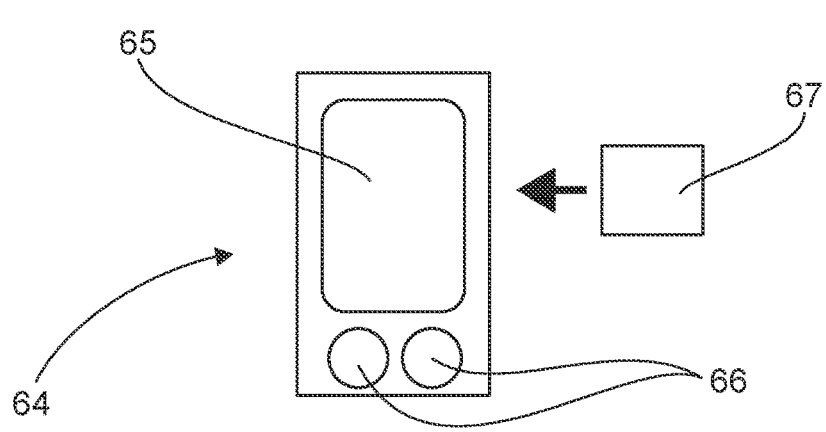
FIG. 6 shows the device for monitoring and assisting with the charge levelisation of a battery module according to the invention.

The embodiment of the device 64 shown in FIG. 6 comprises in particular the following elements:

means for recognising and identifying the charging cable 3 and the charge monitoring cable 4 in the connected configuration, in particular implementing an operation for identifying and for reading the tags 30, 37, 38, 40, 43, 44 integrated into the cables;

means for supplying recognition and identification data determined from the reading of the tags;

means for storing and querying the correspondence and compatibility data library;

comparison means for comparing the recognition and identification data supplied by the recognition and identification means with the data stored in the correspondence and compatibility data library, and means for supplying a comparison result;

display and/or notification means activated by the comparison means.

This device 64 is shown in FIG. 6 in the form of an autonomous unit, i.e. a unit that is movable and independent from the monitoring station 1.

It comprises a display screen 65 forming the display and/or notification means, allowing, on the one hand, the list of references of compatible modules 2 to be displayed, and on the other hand a notification message to be displayed for the operator when necessary.

Two scenarios can in particular be envisaged:

In a first scenario, the combination of a first charging cable 3 and of a second electronic monitoring cable 4, forming a connecting pair 73 of cables, may be incompatible with any battery module 2.

In a second scenario, a battery module 2 may be firstly connected, with an appropriate charging cable 3, to the monitoring station 1, then a second, inappropriate electronic monitoring cable 4 may in turn be connected.

In these two cases, a visual signal via the display 65 as well as optionally an audio signal, can be triggered by the device 64 in order to inform the operator of his/her mistake.

Such a signal can also be triggered in the event that the connections made by the operator are defective or incomplete, thus preventing the charge levelisation operation for the module.

The device as shown in FIG. 6 further comprises, optionally, scrolling keys and/or arrows 66 allowing, for example, choices to be selected and/or confirmed from menus appearing on the screen.

Optionally, the device 64 can also comprise a data input interface (for example a keyboard) which is not shown here.

One (or more) SD (Secure Digital) memory cards 67 can also be inserted into the device in order to input the library and/or collect data or a history, or a SIM card can be inserted to communicate with the station 1 or other element.

According to another possibility (not shown), the device 64 can be directly integrated into the monitoring station 1.

Figure 8A:
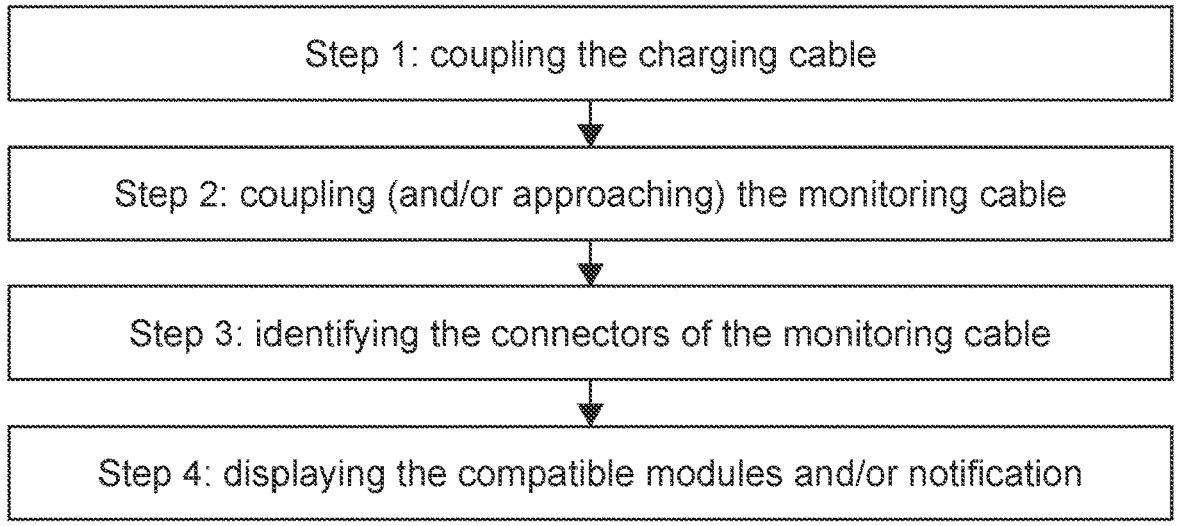
FIG. 8A shows a first embodiment of a method for monitoring and assisting with the charge levelisation of a battery module according to the invention, implementing the monitoring and assistance device of the invention.

A first embodiment of the method for monitoring and assisting with the charge levelisation of the module is described with reference to FIG. 8A.

According to this embodiment, the operator couples a charging cable 3, selected from among a first set 71 of the kit 70, to the interface of the monitoring station 1. The device 64 then identifies, via the recognition and identification means thereof, the tags 30, 37, 38 integrated into the cable or connectors of the charging cable 3 and transmits recognition and identification data corresponding to the information concerning this charging cable 3.

The operator then couples a charge monitoring cable 4, selected from among a second set 72 of the kit 70, to the monitoring station 1. The device 64 then identifies, via the recognition and identification means thereof, which of the tags 40, 43, 44 are integrated into the cable and/or the connectors of the charge monitoring cable 4 and transmits recognition and identification data corresponding to the information concerning this charge monitoring cable 4.

On the basis of these input data, i.e. the information concerning the cables 3 and 4, the device 64 compares—via the comparison means thereof—the input data with the data stored in the correspondence and compatibility data library, and finally displays a list of compatible modules 2 where present, or conversely emits a visual or audible alarm.

According to another embodiment of a method according to the invention, the operator can firstly connect an appropriate charging cable 3, between the module 2 and the monitoring station 1, then use the device 64 to determine which second monitoring cable 4 must be used, or vice-versa.

In such a case, the reference of the charging cable 3 and the reference of the module 2 are the input parameters in the compatibility table, and the reference of the one or more cables 4 is the output parameter.

Figure 8B:
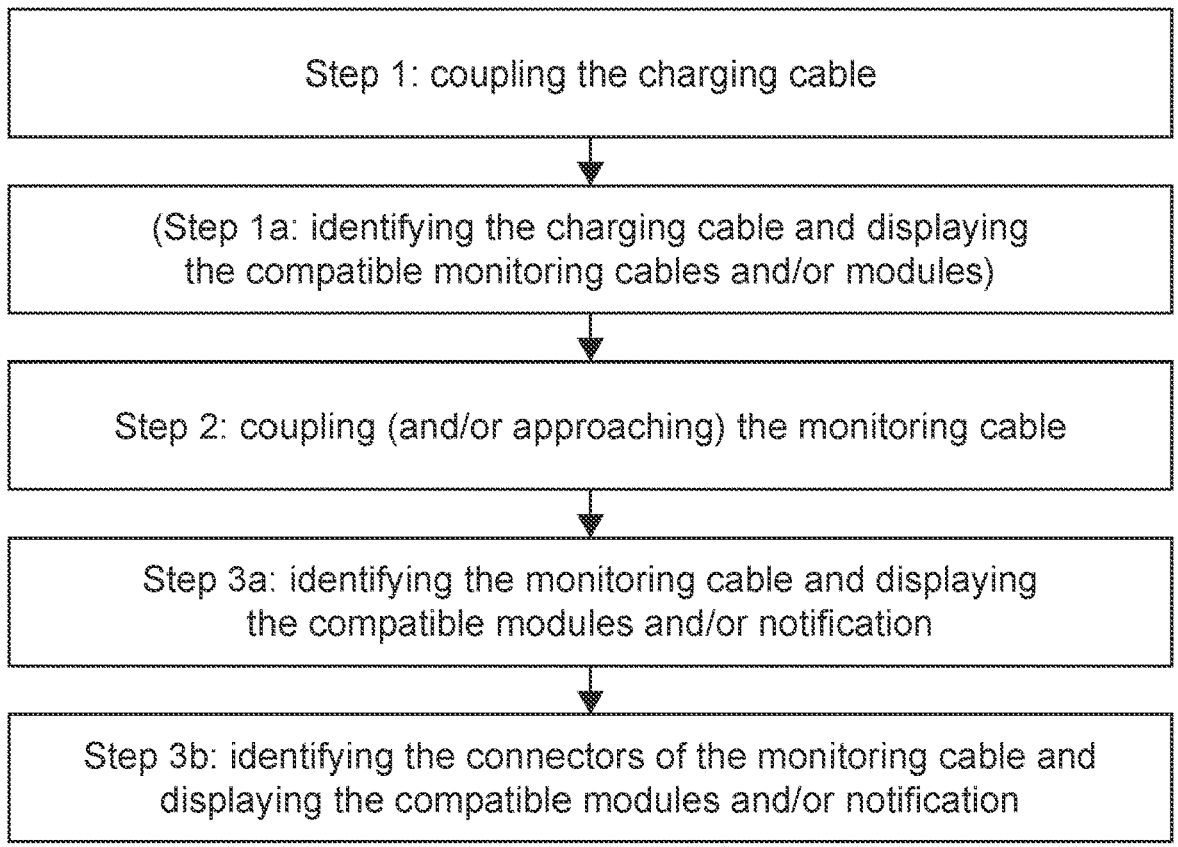
FIG. 8B shows a second embodiment of such a method according to the invention, including steps in addition to or replacing the steps of the method in FIG. 8A.

Alternative embodiments of the monitoring and assistance method according to the invention are described with reference to FIG. 8B.

According to an alternative embodiment, after the described step of identifying the tags 30, 37, 38 integrated into the charging cable 3 described with reference to FIG. 8A, the device 64 compares—via the comparison means thereof—the input datum corresponding to the information concerning this first charging cable 3 with the data stored in the correspondence and compatibility data library, and displays a list of compatible charge monitoring cables 4, where present, or conversely emits a visual or audible alarm.

The operator then couples a charge monitoring cable 4, as proposed by the device 64, to the monitoring station 1.

The subsequent steps are the same as those described with reference to FIG. 8A.

Finally, according to another embodiment of the invention, the operator can input in the device 64, via data entry means (not shown), the reference of a battery module 2 before connecting the different cables 3, 4 to the charge levelisation and monitoring station 1, then query the device to determine which combination of cables 3, 4 can be used.

In such a case, the reference of the module 2 is the input parameter in the compatibility table, and the references of the cables 3, 4 are the output parameters.

Figure 9:
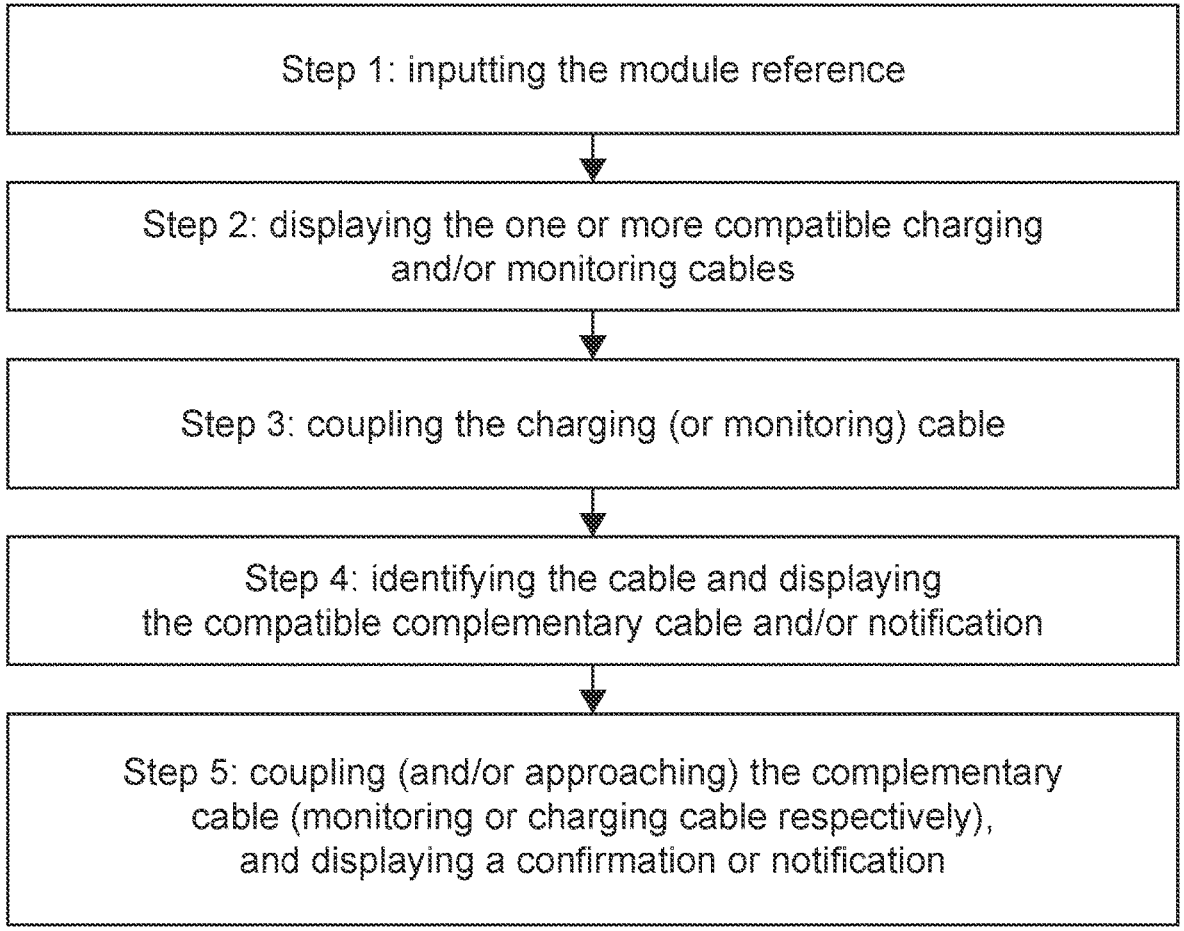
FIG. 9 shows an alternative embodiment of the method for monitoring and assisting with the charge levelisation of a battery module according to the invention, wherein the input data are constituted by at least one module reference.

This other alternative embodiment of the monitoring and assistance method of the invention is described with reference to FIG. 9.

The operator inputs, via the data entry means, a reference of a battery module 2 that is to be charged.

The device 64 compares—via the comparison means thereof—this input parameter corresponding to the reference of the module with the data stored in the correspondence and compatibility data library, and displays a list of charging cable 3 and charge monitoring cable 4 combinations compatible with the module, where present, or conversely emits a visual or audible alarm.

The operator can then couple a first cable from among a charging cable 3 or a charge monitoring cable 4 proposed: the device 64 then identifies, via the recognition and identification means thereof, the tags 30, 37, 38, 40, 43, 44 integrated into the cable and/or the connectors of the coupled cable and transmits recognition and identification data corresponding to the information concerning this first coupled cable.

By comparing this information with the library via the compatibility table, the device 64 displays a list of references corresponding to the possible complementary cables compatible with the module and the first coupled cable.

Finally, the operator couples a complementary cable, selected from among the proposed references: by comparing this information with the library via the compatibility table, the device 64 displays a confirmation of the compatibility of the connecting pair 73 of cables (i.e. a charging cable 3 and a charge monitoring cable 4) with the module 2 or conversely emits an audible or visual alarm.

The invention claimed is:

1. A device for use in monitoring and assisting with the charge levelisation of a battery module (2), operable to cooperate with a kit (70) of cabling devices designed to be connected to both an electronic monitoring circuit of an electric battery module and a station for monitoring said battery module,
   said kit (70) of cabling devices (3, 4) comprising a first set (71) of at least two charging cables (3) and a second set (72) of at least two charge monitoring cables (4),
   each cabling device in a configuration in which it is connected to a determined battery module comprising a connecting pair (73) of a complementary compatible one of the at least two charging cables and one of the at least two charge monitoring cables, each selected from said kit (70) of cabling devices such that they are compatible with said battery module;
characterised in that the device comprises:
   means for recognising and identifying said selected one charging cable (3) and said selected one charge monitoring cable (4) of said cabling device in the connected configuration, and means for supplying recognition and identification data;
   means for storing and querying a correspondence and compatibility data library between said battery modules and said at least two charging cables and at least two monitoring cables (3, 4) of said kit (70) of cabling devices compatible with each of said battery modules;
   comparison means for comparing the recognition and identification data supplied by said recognition and identification means with the data stored in said correspondence and compatibility data library, and means for supplying a comparison result; and
   at least one of display or notification means activated by said comparison means.

2. The device for monitoring and assisting with the charge levelisation of a battery module (2) according to claim 1, characterised in that said at least one of the at least two charge monitoring cables (4) is a multi-connector cable, comprising:
   a main cabling branch (45) situated at a first end of said monitoring cable (4), said main branch (45) being provided with a connection plug (451) operable to be connected to a complementary terminal (11) of said monitoring station;
   a plurality of secondary cabling branches (41, 42), each of said secondary branches (41, 42) being provided with an electrical connector operable to be connected to a complementary connector (22) of said battery module (2).

3. The device for monitoring and assisting with the charge levelisation of a battery module (2) according to claim 2, characterised in that said at least one charge monitoring cable (3, 4) further comprises identifying elements connected to at least one of the main branch or at least one of the main branch connector plug or each secondary branch electrical connector; and
   said recognition and identification means operable to detect and read said identifying elements.

4. The device for monitoring and assisting with the charge levelisation of a battery module (2) according to claim 3, wherein said identifying elements comprise at least one of electronic or electromagnetic chips, tags, beacons, measuring circuits, or RFID chips.

5. The device for monitoring and assisting with the charge levelisation of a battery module (2) according to claim 1, characterised in that said the at least one of display or notification means comprise a display screen.

6. The device for monitoring and assisting with the charge levelisation of a battery module (2) according to claim 5, characterised in that said at least one of display or notification means further comprises a data entry screen.

7. The device for monitoring and assisting with the charge levelisation of a battery module (2) according to claim 1, characterised in that said device (64) is an autonomous unit from the monitoring station.

8. The device for monitoring and assisting with the charge levelisation of a battery module (2) according to claim 1, characterised in that said device (64) is integrated into said monitoring station.

9. The device for monitoring and assisting with the charge levelisation of a battery module (2) according to claim 1, further comprising means for updating said library.

10. A method for monitoring and assisting with the charge levelisation of a battery module (2), intended to cooperate with at least one charging cable (3) and at least one charge monitoring cable (4), selected from within a kit (70) of cabling devices operable to be connected to both an electronic monitoring circuit of an electric battery module and a station for monitoring said battery module,
said kit (70) of cabling devices (3, 4) being formed by a first set (71) of at least two charging cables (3) and by a second set (72) of at least two charge monitoring cables (4),
each cabling device in a configuration in which it is connected to a determined battery module comprising a connecting pair (73) of complementary compatible one of the at least two charging cables and one of the at least two charge monitoring each selected from said kit (70) of cabling devices such that they are compatible with said battery module,
said method implementing a device according to claim 1, intended to cooperate with said kit (70),
the method comprising the steps of:
coupling said charging cable (3) to said monitoring station;
at least one of coupling said monitoring cable (4) to said monitoring station or placing said monitoring cable (4) in the vicinity of said monitoring station;
identifying said monitoring cable (4) by said recognition and identification means of the device; and
determining and displaying a list of references of battery modules (2) compatible with said coupled charging cable (3) and said coupled or vicinity placed charge monitoring cable (4).

11. The method for monitoring and assisting with charge levelisation according to claim 10, wherein after coupling said charging cable (3), the method further comprises theft step of identifying said coupled charging cable (3) by said recognition and identification means of the device.

12. The method for monitoring and assisting with charge levelisation according to claim 11, further comprising the step of displaying at least one of the charge monitoring cables (4) or the battery modules compatible with said coupled charging cable (3).

13. The method for monitoring and assisting with charge levelisation according to claim 10, further comprising the step of at least one of activating said display or notification means of said device by said comparison means when said comparison result between said recognition and identification data and the data stored in said correspondence and compatibility data library is zero.

14. The device for monitoring and assisting with the charge levelisation of a battery module according to claim 1 wherein each cabling device further comprises:
a main cabling branch having a first end and a second end;
a connection plug positioned at the main cabling branch first end operable to connect to the monitoring station; and
at least two secondary branches each having a first end and a second end, each secondary branch first end connected to the main cabling branch second end and an electrical connector positioned at the secondary branch second end, the electrical connector operable to connect to a complimentary connector of the battery module.

15. The device for monitoring and assisting with the charge levelisation of a battery module according to claim 14, wherein each cabling device further comprises at least one identifying element, wherein the recognition and identification means are operable to detect and read the identifying element.

16. The device for monitoring and assisting with the charge levelisation of a battery module according to claim 15, wherein the at least one identifying element further comprises:
an first identifying element connected to the main cabling branch; and
a second identifying element connected to each of the at least two secondary branches electrical connectors.

17. A system device for use in monitoring and assisting with the charge levelisation of a battery module using a monitoring station, the system comprising:
a kit of cabling devices operable to connect to the monitoring station and the battery module, the cabling devices further comprising:
a first set of at least two charging cables having connectors operable to respectively connect to the monitoring station and the battery module;
a second set of at least two charge monitoring cables having connectors operable to respectively connect to the monitoring station and the battery module, each of the first set at least two charging cables and the second set of at least two charging cables further comprising at least one identifying element operable to identify the specific type of charging cable or charge monitoring cable, wherein one of a selected one of the at least two charging cables from the kit and a selected one of the at least two charge monitoring cables from the kit compatable with a determined battery module comprise a connecting pair of cables operable to connect to monitoring station to the determined battery module;
a device operable to assist in monitoring and assisting with the charge levelisation of a a battery module, the device further comprising:
a housing;
a memory storage device having a data library including a plurality of battery module references, a plurality of charging cable references, and a plurality of charge monitoring cable references;

a compatibility table of charging cables, charge monitoring cables and battery modules stored in the memory storage device;

a recognition and identification device operable to detect the identifying element on a respective of the selected one of the charging cable and the charge monitoring cable of the connecting pair of cables;

a comparator operable to compare the detected identifying element to at least one of the data library or the compatibility table to determine if the connecting pair of cables is compatable with a determined battery module; and a display screen connected to the housing operable to provide notification of the compatibility of the connecting pair of cables with the determined battery module.

18. The system device of claim 17 wherein each cabling device further comprises:

a main cabling branch having a first end and a second end;

a connection plug positioned at the main cabling branch first end operable to connect to the monitoring station; and at least two secondary branches each having a first end and a second end, each secondary branch first end connected to the main cabling branch second end and an electrical connector positioned at the secondary branch second end, the electrical connector operable to connect to a complimentary connector of the battery module.

19. The system device of claim 17 wherein the device is autonomous from the monitoring station.

* * * * *